United States Patent
Rai et al.

(10) Patent No.: US 12,436,842 B2
(45) Date of Patent: Oct. 7, 2025

(54) SYSTEMS AND METHODS OF DISTRIBUTED PARITY CALCULATION OFFLOADING

(71) Applicant: Kioxia Corporation, Tokyo (JP)

(72) Inventors: Devesh Kumar Rai, San Ramon, CA (US); Mohinder Kumar Saluja, Cupertino, CA (US)

(73) Assignee: KIOXIA CORPORATION, Tokyo (JP)

( * ) Notice: Subject to any disclaimer, the term of this patent is extended or adjusted under 35 U.S.C. 154(b) by 20 days.

(21) Appl. No.: 18/123,238

(22) Filed: Mar. 17, 2023

(65) Prior Publication Data

US 2024/0232009 A1 Jul. 11, 2024

Related U.S. Application Data

(60) Provisional application No. 63/438,451, filed on Jan. 11, 2023.

(51) Int. Cl.
*G06F 11/10* (2006.01)
(52) U.S. Cl.
CPC ........ *G06F 11/108* (2013.01); *G06F 11/1076* (2013.01); *G06F 11/1096* (2013.01)

(58) Field of Classification Search
CPC ............ G06F 13/4221; G06F 11/1096; G06F 11/1068
See application file for complete search history.

(56) References Cited

U.S. PATENT DOCUMENTS

| | | | | |
|---|---|---|---|---|
| 5,765,183 A * | 6/1998 | Kojima | ............... | G06F 11/1076 714/E11.034 |
| 6,237,052 B1 * | 5/2001 | Stolowitz | ............... | G06F 3/0626 714/764 |
| 11,847,324 B2 * | 12/2023 | Lee | ........................ | G06F 3/0644 |
| 2019/0065306 A1 * | 2/2019 | Margetts | ............. | G06F 11/1068 |
| 2020/0409890 A1 * | 12/2020 | Bueb | ........................ | G06F 13/16 |

* cited by examiner

*Primary Examiner* — Joseph D Torres
(74) *Attorney, Agent, or Firm* — Foley & Lardner LLP

(57) ABSTRACT

A system and a method for offloading distributed parity calculations from a server including a plurality of solid-state drives (SSDs) in communication with a host via a host interface. Each SSD includes a processor. The processor of each SSD may be configured to access a host address space via the host interface, determine parity information for data stored across a plurality of buffers in the host address space, and output the parity information to the host interface.

20 Claims, 14 Drawing Sheets

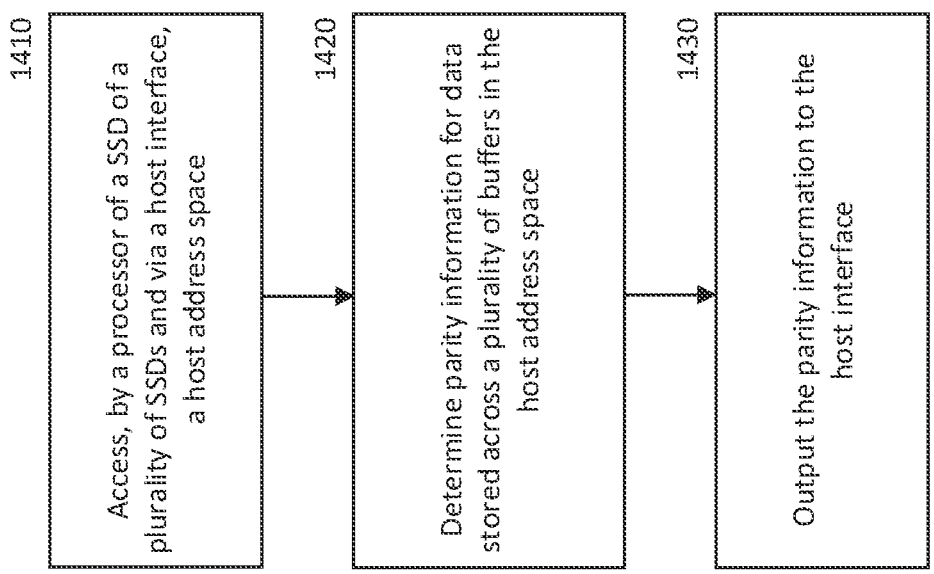

SYSTEMS AND METHODS OF DISTRIBUTED PARITY CALCULATION OFFLOADING

CROSS-REFERENCE TO RELATED APPLICATIONS

This application is based upon and claims the benefit of priority from U.S. Provisional Application No. 63/438,451, filed on Jan. 11, 2023, the entire contents of which are incorporated herein by reference.

FIELD

The present disclosure relates to systems and methods for offloading parity bit calculations from a server to a solid-state drive (SSD) to reduce double-data-rate (DDR) bandwidth, remove serialization in parity calculations, and improve system efficiency.

BACKGROUND

Generally, a server in communication with a memory device will calculate the parity bits corresponding to data to be stored on the memory. However, offloading such calculations to other system components frees up the server's bandwidth to perform other functions. The calculations can be offloaded to a memory device connected to the server, such as a solid-state drive (SSD), which can perform parity calculations in series or in parallel. The parity bits thus calculated by the memory devices can be written to said memory devices in parallel with the corresponding data on which the parity calculations are based.

Calculation of parity bits corresponding to the data in an application buffer allows for straightforward implementation of data redundancy and facilitates the detection of single bit errors in the data. In a memory device such as a RAID array, configuring one disk to hold the parity bits of corresponding data stored on some number of other disks allows for the data on said other disks to be reconstructed using the parity bits, should one such other disk fail. Parity bits are calculated by applying exclusive-or (XOR) operations to two or more data sets. Table 1 demonstrates a simple example of the possible results of a two-bit input XOR parity operation in which the parity operation output is a 0 if the input bits are different, and is a 1 if the input bits are the same.

TABLE 1

Exemplary XOR Parity Results

| Inputs | | Parity Output |
|---|---|---|
| 0 | 0 | 1 |
| 0 | 1 | 0 |
| 1 | 0 | 0 |
| 1 | 1 | 1 |

Using parity calculations performed as such, one of the inputs can be recovered based on the other input and the parity bit. For example, based on Table 1, if it is known that a first input to the parity calculation is a '0', and that resultant parity bit is a '1', then it can be determined that the second input to the parity calculation was a '0'. In this manner, parity calculations allow for lost inputs to be recovered and provide redundancy.

In order to perform parity calculations, servers currently pay a heavy cost in terms of DRAM bandwidth, CPU usage, and performance when performing parity calculations (and other operations, including eraser code computation, data compression and decompression, and encryption). A typical server connected to an array of SSDs, however, may have 16 to 24 connected SSDs. Because a typical server may be connected to 16 to 24 SSDs, the server may have insufficient bandwidth to perform parity calculations, relative to the SSDs.

SUMMARY

According to an embodiment of the present disclosure, there is provided a system comprising a plurality of solid-state drives (SSDs) in communication with a host via a host interface, each SSD comprising a processor. The processor of each SSD in the system is configured to access a host address space via the host interface. The processor of each SSD in the system is also configured to determine parity information for data stored across a plurality of buffers in the host address space. Further, the processor of each SSD in the system is also configured to output the parity information to the host interface.

According to another embodiment of the present disclosure, there is provided a method for performing parity calculations by a plurality of solid-state drives (SSDs), the method comprising accessing, by a processor of an SSD of the plurality of SSDs, a host address space via a host interface through which each SSD of the plurality of SSDs is in communication with the host address space. The method further comprises determining parity information for data stored across a plurality of buffers in the host address space. The method also comprises outputting the parity information to the host interface.

In some implementations, the each SSD comprises a nonvolatile memory device associated with the processor of the each SSD of the plurality of SSDs, and the processor is further configured to write data stored in one of the plurality of buffers to the associated nonvolatile memory device, the data written being different from the data for which parity information is determined. In certain implementations, the processor of at least one SSD of the plurality of SSDs is configured to write the parity information determined by the processor of the each SSD of the plurality of SSDs to its associated nonvolatile memory device. In further implementations, each buffer of the plurality of buffers in the host address space is divided into a number of subsets, each subset comprising a range of addresses of data stored in the plurality of buffers, and the processor of the each SSD of the plurality of SSDs determines parity information for a subset across the plurality of buffers. In some implementations, the number of subsets is equivalent to the number of SSDs in the plurality of SSDs.

In further implementations, the processor of the each SSD of the plurality of SSDs is configured to execute a write command from the host in parallel. In some implementations, the processor of the each SSD of the plurality of SSDs is configured to access the entirety of the host address space. In certain implementations, the host interface is a peripheral component interface express (PCIe) interface. In further implementations, the processor of the each SSD of the plurality of SSDs is a direct memory access controller (DMAC) engine. In some implementations, the nonvolatile memory device associated with the processor of the each SSD of the plurality of SSDs comprises a NAND memory device. In certain implementations, the plurality of buffers in the host address space are of equal size.

The embodiments described herein illustrate the benefits attained in offloading the responsibility for parity calculations from a server to SSDs in the array connected thereto. This decoupling of parity calculations from the I/O path frees up the server's bandwidth to perform other calculations.

BRIEF DESCRIPTION OF DRAWINGS

The foregoing and other objects and advantages will be apparent upon consideration of the following detailed description, taken in conjunction with the accompanying drawings, in which like reference characters refer to like parts throughout, and in which:

FIG. 14 illustrates how an exemplary method of performing parity calculations by a SSD according to one or more embodiments of the present disclosure.

DETAILED DESCRIPTION

Decoupling of parity calculations may be performed by a processor of an SSD. The processor may be configured to perform XOR operations, and thus serve as an XOR engine. In general, any additional data processing unit (DPU) in communication with the server may also perform the parity bit calculations. Regardless of the component of the system to which the parity calculations are offloaded, the server will benefit from freed-up bandwidth as the parity bit calculations are offloaded to the XOR engines of SSDs.

Figure 1:
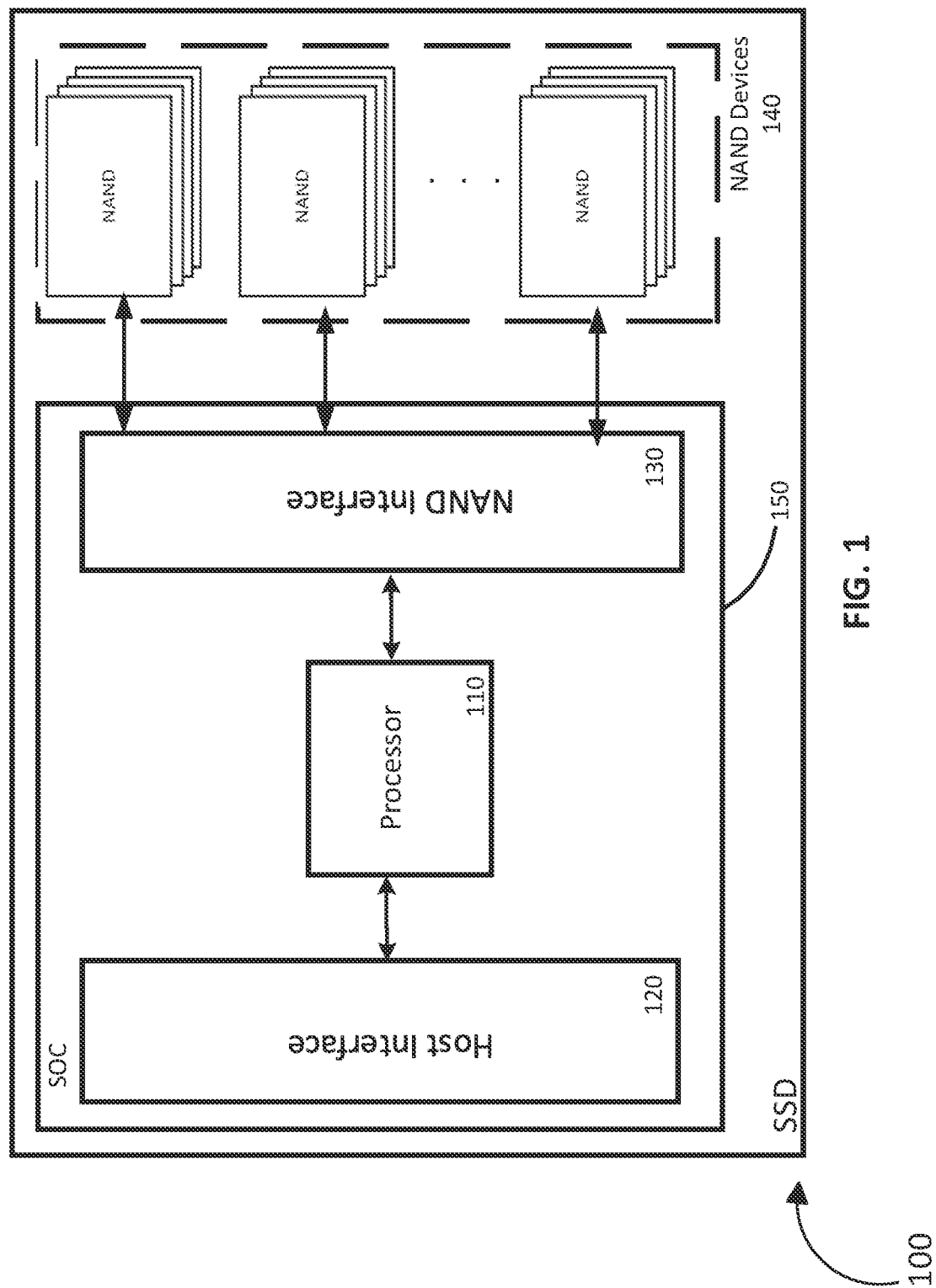
FIG. 1 illustrates a schematic representation of an SSD, configured according to one or more embodiments of the present disclosure.

FIG. 1 is a block diagram of a solid-state drive (SSD) 100 for use in the systems and methods described herein. SSD 100 comprises a processor 110 in communication with both a host interface 120 and a NAND interface 130. The processor 110 communicates with a host (not shown) via the host interface 120. Host interface 120 may be, in some embodiments, a peripheral component interface express (PCIe) link. Processor 110 also communicates with a plurality of nonvolatile memory devices 140 via the NAND interface 130. While FIG. 1 shows that SSD 100 comprises NAND devices 140, other nonvolatile memory devices could be implemented in SSD 100 without loss of generality. Processor 110, host interface 120, and NAND interface 130 of SSD 100 may be implemented as a system-on-a-chip (SoC). SoCs are advantageous as they provide a single integrated circuit that contains all of the circuitry and components of the electronic system for the SSD to function.

Figure 2:
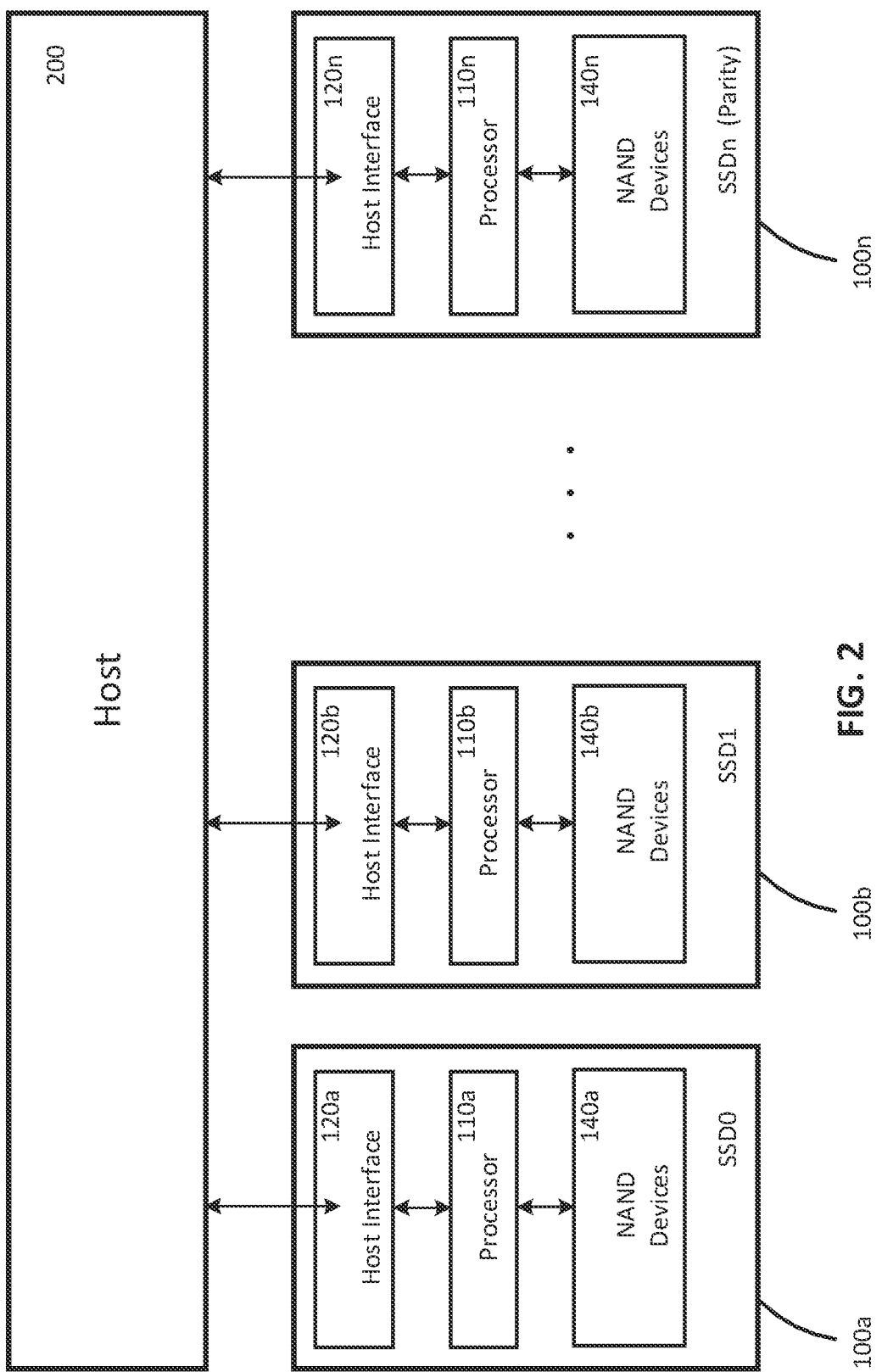
FIG. 2 illustrates exemplary SSD system comprising a plurality of SSDs in communication with a host.

FIG. 2 is a block diagram of an SSD system comprising a host 200 in communication with a plurality of SSDs 100a, 100b, . . . , 100n. The host 200 may be a computing system that comprises processors, memories, and other components as generally known in the art. Such components of the host 200 are not illustrated in FIG. 2 for the sake of brevity.

Each SSD 100a, 100b, . . . , 100n of the plurality of SSDs also comprises a respective host interface 120a, 120b, . . . , 120n; a respective processor 110a, 110b, . . . , 100n; and a respective plurality of NAND devices 140a, 140b, . . . , 140n.

The processor 110a of SSD 100a is configured to communicate with host 200 via host interface 120a. Similarly, the processor 110b of SSD 100b is configured to communicate with host 200 via host interface 120b. The processors 110a, 110b, . . . , 110n may be direct memory access controller (DMAC) engines. While only three SSDs are illustrated in FIG. 2, any number of SSDs may be in communication with the host.

The processor 110a, 110b, . . . , 110n, of each solid state drive 100a, 100b, . . . , 100n, may communicate with the entirety of an address space of the host 200 via the respective host interface 120a, 120b, . . . , 120n. Host 200 may comprise a host address space in which data is stored, each such datum in the space being assigned an address that can be used to locate the data. As described herein, a host address space can partition the data it contains based on address ranges to form subsets, or buffers, within the host address space. According to an embodiment of the present disclosure if the host address space is arranged to include independent buffers for data and for the data's corresponding parity data, the controller memory buffers (CMBs) of the SSDs in communication therewith may be able to access the entirety of the host address space. This allows the SSDs to transfer data between each other via the host. The host thus ensures cache coherency as data is moved between SSDs. By further allocating a buffer in the host memory space to hold parity data, the efficient offloading of distributed parity calculations can be achieved by SSDs 100a, 100b, . . . , 100n according to the parity calculation schematics as described herein.

Figure 3:
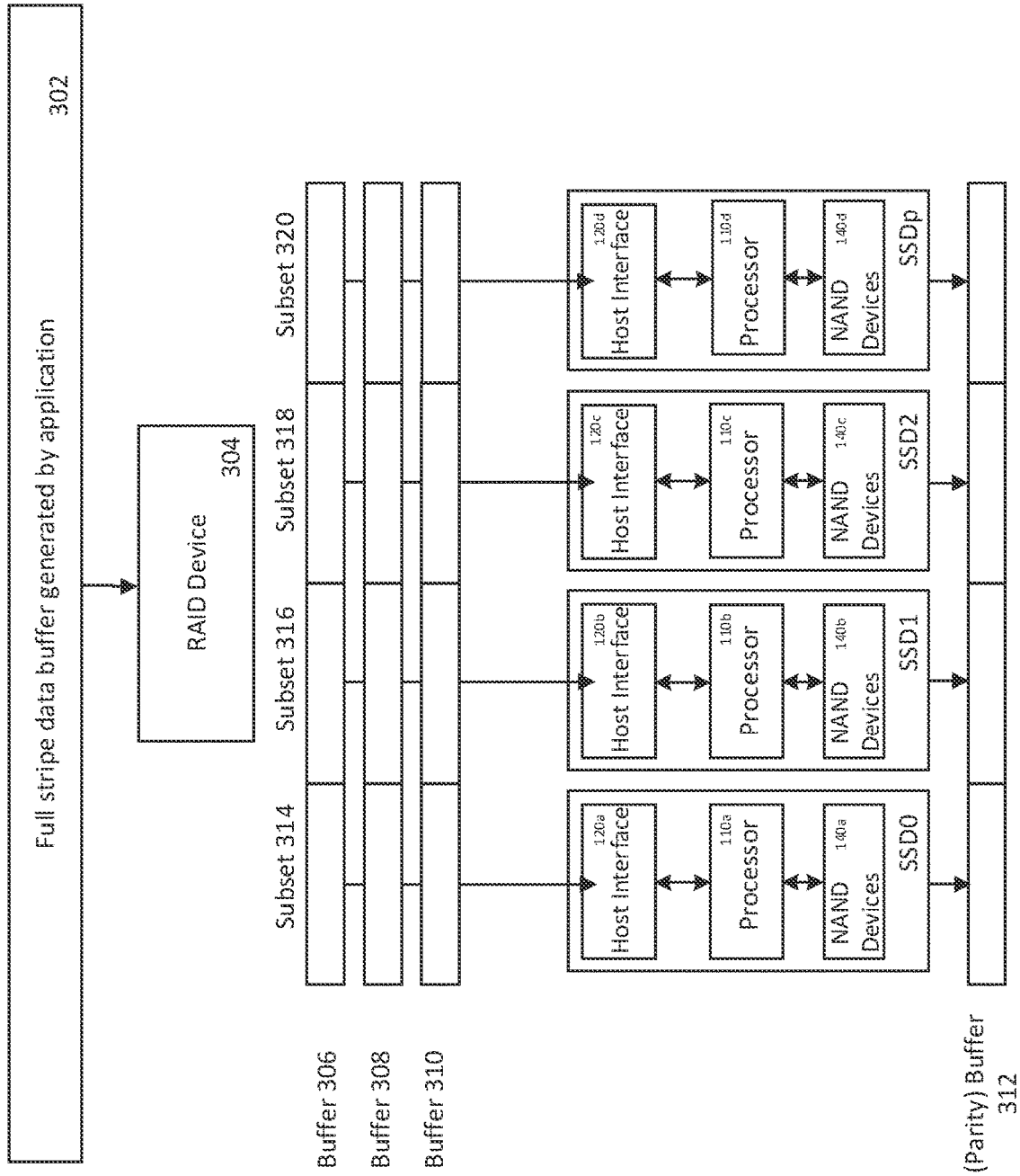
FIG. 3 illustrates an exemplary SSD system in which SSDs perform parity calculations on subsets of data across buffers stored in a host.

FIG. 3 illustrates an embodiment of an SSD system as described in FIG. 2. In the embodiment of FIG. 3, four SSDs (SSD0, SSD1, SSD2, SSDp) are configured to write and perform parity calculations on data stored within the address space of host 300.

In FIG. 3, a full data stripe 302 is generated, for example, by an application (e.g., firmware or software application) executed by the host. The application issues a write request to RAID device 304. RAID device 304 is a virtual device created on three or more physical SSDs: SSD0, SSD1, SSD2, and SSDp. SSDp is designated to store parity data corresponding to the data stored on SSD0, SSD1, and SSD2. In order to facilitate the write request, the host divides the data stripe 302 into a number of segments, or buffers, each segment corresponding to a range of addresses in the host address space, and each range of addresses containing data that is buffered in the segment before being written to a SSD. In the embodiment of FIG. 3, the host divides stripe 302 into buffers 306, 308, and 310. The size of the buffers is determined upon the creation of the RAID device, and depends on the number of physical drives that the RAID device comprises. The number of buffers may be equal to the number of drives onto which the data in stripe 302 will be written upon completion of the write request. Additionally, the host allocates at least one segment in the host address space to serve as a buffer for parity data related to the data in stripe 302. The parity buffer may be configured to be of the same size as each of the buffers into which the data stripe 302 is divided.

The host further divides each buffer into a plurality of subsets 314, 316, 318, and 320 and then submits an XOR request to the SSDs to perform parity computations on the data in the buffers. The number of XOR requests submitted by the host is equal to the number of processors that will be used to perform the parity calculations. In the embodiment of FIG. 3, the host submits four XOR requests-one for each processor of each illustrated SSD. Each of SSD0, SSD1, SSD2, and SSDp performs, via its respective processor, parity calculations on a given subset across the plurality of buffers 306, 308, and 310.

In the embodiment shown in FIG. 3, SSD0 performs, via processor 110a, parity calculations on subset 314 of buffers 306, 308, and 310. SSD1 performs, via processor 110b, parity calculations on subset 316 of buffers 306, 308, and 310. SSD2 performs, via processor 110c, parity calculations on subset 318 of buffers 306, 308, and 310. SSDp performs, via processor 110d, parity calculations on subset 320 of buffers 306, 308, and 310. The server is relieved of the bandwidth to perform the parity calculations by virtue of these calculations being offloaded to the processors of the SSDs.

Upon completion of the parity calculations by the processors of each of the SSDs SSD0, SSD1, SSD2, and SSDp, the respective processors output, via the respective host interfaces of the SSDs, the results of the parity calculations to a designated parity buffer 312 in the host address space. As will be described further with respect to FIGS. 4 and 5, once the processors of the SSDs output the results of their parity calculations to parity buffer 312, the host can issue a write command to the SSDs, instructing them to write the data stored in the buffer for which the parity data was calculated, as well as the parity data.

The implementation of the parity calculations described by FIG. 3 may be referred to as a "column-wise" XORing scheme, as opposed to a row-rise XOR scheme in which parity operations are performed on a buffer-by-buffer basis. In FIG. 3, each labeled subset 314-320 represents a "column" of data.

Each such subset is assigned to a processor available in one SSD, where the number of processors used is equivalent to the number of subsets into which the data is divided. Without limits on the maximum number of processors that can be used to perform the parity calculations, more XOR operations can be performed in parallel, resulting in more efficient parity bit calculations.

The column-wise XORing mechanism described by FIG. 3 provides a number of advantages. In each subset, the width of the data is the same, but different subsets can have varying data widths with respect to one another. Each SSD publishes its processor capability (e.g., the size of the buffer that the SSD can possess to hold interim parity data) through a controller identify command. The size of the subset on which each SSD is then instructed to perform parity calculations can then be adapted based on the SSD's particular published capabilities. In this way, the column-wise XORing scheme is adaptable to any particular use case, regardless of the SSD capabilities. Further, use of a column-wise XORing scheme removes time-intensive serialization of parity calculations and improves performance scale at the expense of PCIe bandwidth. The implementation of offloaded distributed parity calculations via column-wise XORing adds no extra failure condition.

Figure 4:
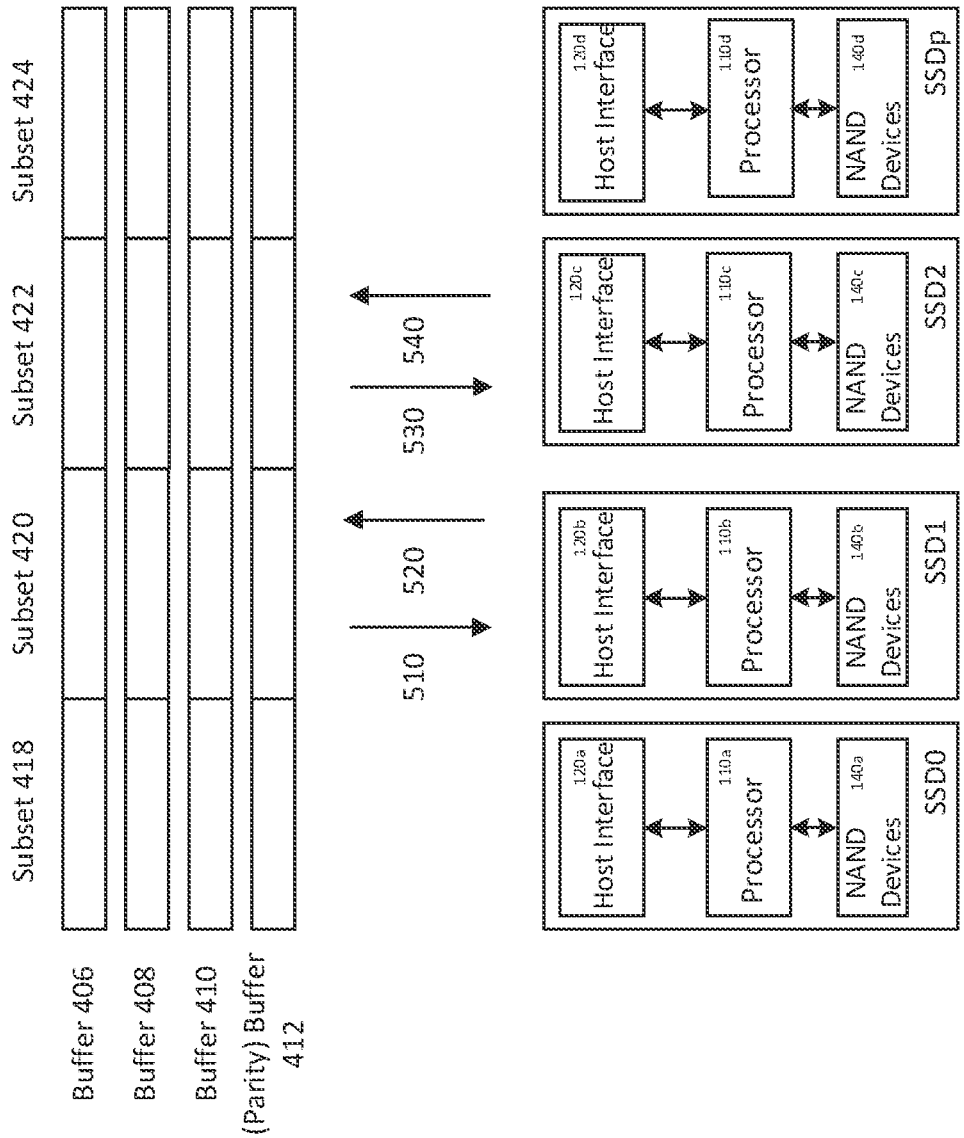
FIG. 4 illustrates an exemplary workflow describing how SSDs in an SSD system according to one or more embodiments of the present disclosure write a full stripe of data and perform parallel parity calculations on the full stripe of data.
Figure 5:
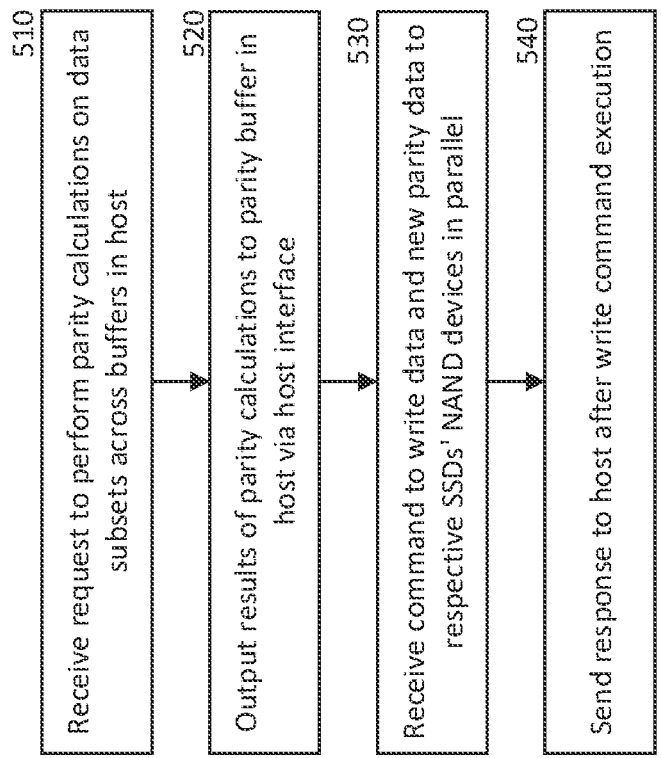
FIG. 5 illustrates a flowchart corresponding to the exemplary workflow of FIG. 4 according to one or more embodiments of the present disclosure.

FIG. 4 shows an embodiment of a SSD system in which four SSDs (SSD0, SSD1, SSD2, SSDp) are configured to write a full stripe of data stored in buffers 406, 408, and 410, along with corresponding parity data, to their respective NAND devices, according to an embodiment of the present disclosure. FIG. 5 is a flowchart corresponding to FIG. 4, illustrating the steps by which the four SSDs shown in FIG. 4 perform their parity calculations and write the data.

First (arrow 510 in FIG. 4; step 510 of FIG. 5), the plurality of SSDs receive a request to perform parity calculations on subsets of data stored across buffers 406, 408, and 410 in the host address space. In the embodiment of FIG. 4, SSD0 will perform, via processor 110a, parity calculations on subset 418 of buffers 406, 408, and 410. SSD1 will perform, via processor 110b, parity calculations on subset 420 of buffers 406, 408, and 410. SSD2 will perform, via processor 110c, parity calculations on subset 422 of buffers 406, 408, and 410. SSDp will perform, via processor 110d, parity calculations on subset 424 of buffers 406, 408, and 410.

Next (arrow 520 in FIG. 4; step 520 of FIG. 5), the plurality of SSDs output, by their respective processors and via their respective host interfaces, the results of their parity calculations to parity buffer 412 in the host address space. By virtue of the CMB of each SSD being able to communicate with the entirety of the host address space, each SSD can access the designated parity buffer and output their parity calculation results thereto.

After outputting the results of their parity calculations to the designated parity buffer 412 in the host address space, in step 530 of FIG. 5 (corresponding to arrow 530 of FIG. 4), the SSDs receive a write command from the host. The write command instructs the SSDs to write the data contained in the buffers (including the data in the newly populated parity buffer 412) to their respective NAND devices, in parallel. In particular, the host will instruct SSD0 to write, via its processor 110a, the data contained in buffer 406 to NAND devices 140a. Further, the host will instruct SSD1 to write, via its processor 110b, the data contained in buffer 408 to NAND devices 140b. The host will instruct SSD2 to write, via its processor 110c, the data contained in buffer 410 to NAND devices 140c. Then host will also instruct SSDp to write, via its processor 110d, the parity data contained in parity buffer 412 to NAND devices 140d. The processors 110a, 110b, 110c, and 110d can execute these write commands in parallel and in this way, serialization is removed.

Finally (arrow 540 of FIG. 4, step 540 of FIG. 5), the processors of each of the SSDs will send a response to the host, acknowledging that the write command of arrow 530/step 530 has been completed.

According to another embodiment of the present disclosure, instead of each of SSD0, SSD1, SSD2, SSDp sending the results of their respective parity calculations back to the host for writing, via a designated parity buffer, to the designated parity SSD, each of the outputs the result of its parity computation to the designated parity SSD, SSDp. This provides the advantage that the parity calculation results of each SSD are peer-to-peer (P2P) transferred to the designated parity drive without needing to involve the host memory. As such, these P2P communications free up host CPU cycles for other operations.

Figure 6:
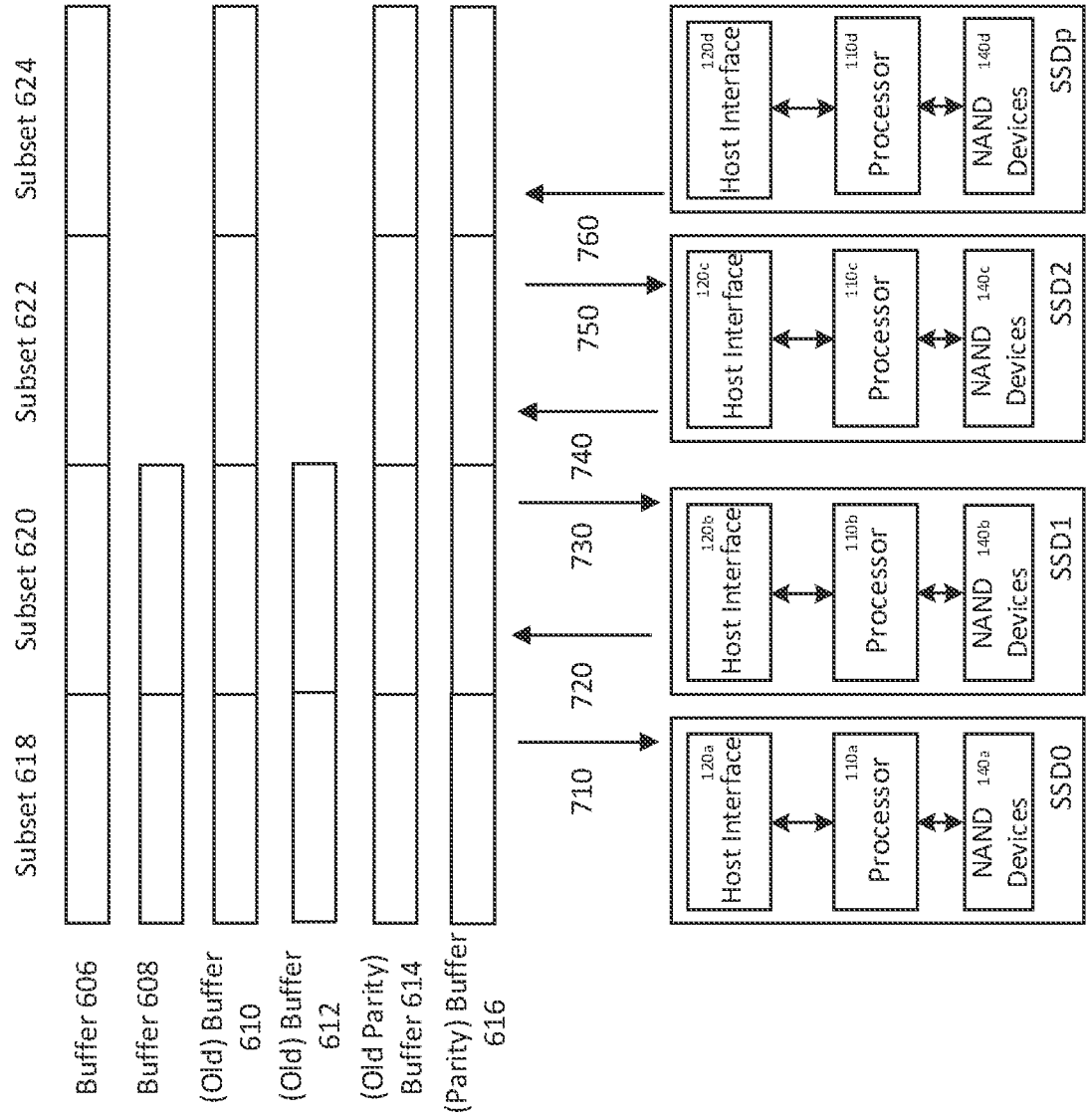
FIG. 6 illustrates an exemplary workflow describing how SSDs in an SSD system according to one or more embodiments of the present disclosure write a partial stripe of data and perform parallel parity calculations on the partial stripe of data.
Figure 7:
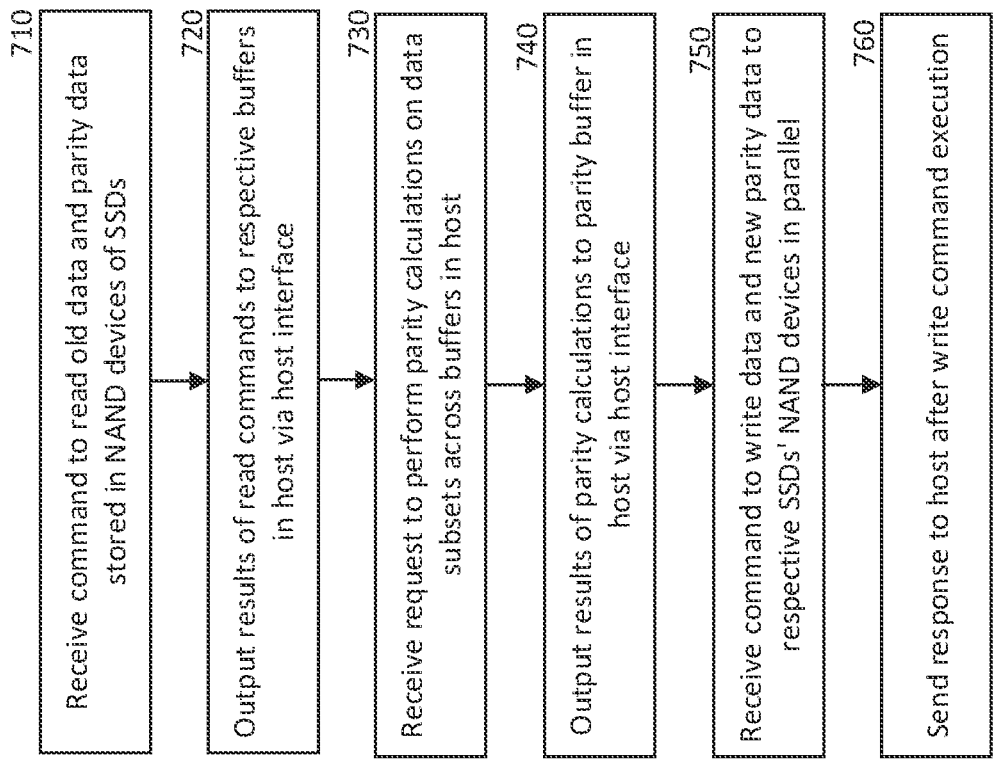
FIG. 7 illustrates a flowchart corresponding to the exemplary workflow of FIG. 6 according to one or more embodiments of the present disclosure.

FIG. 6 shows an embodiment of a SSD system in which four SSDs (SSD0, SSD1, SSD2, SSDp) are configured to write a partial stripe of new data stored in buffers 606 and 608, along with newly computed corresponding parity data, to their respective NAND devices. FIG. 7 is a flowchart corresponding to FIG. 6, illustrating the steps by which the four SSDs shown in FIG. 6 perform their parity calculations and write the data.

In the embodiment of FIGS. 6 and 7, the host address divides a stripe of new data into buffers 606 and 608, and allocates additional buffers 610, 612, and 614 in the host address space to store old data and old parity data read from the SSDs, as described below. The host address space is also configured with a buffer 616 allocated to store new parity data calculated by SSD0, SSD1, SSD2, and SSDp. In the illustrated embodiment, drives SSD0 and SSD1 already have data written on their respective NAND devices 140a and 140b when they receive a request to perform parity calculations from the host. Similarly, SSDp already has parity data corresponding to the data in SSD0 and SSD1 written on its NAND devices 140d when the parity calculation request is issued.

First (arrow 710 of FIG. 6, step 710 of FIG. 7), the SSDs receive a read command from the host instructing the processors 110a and 110b, of respective SSDs SSD0 and SSD1 to read data previously stored on their respective NAND devices and to output that data via respective host interfaces 120a and 120b to the respective old data buffers 610 and 612.

In response to the issued command (arrow 720 of FIG. 6, step 720 of FIG. 7), SSD0 will, via host interface 120a, output its data written in NAND devices 140a to old data buffer 610, and SSD1 will, via host interface 120b, output its data written in NAND devices 140b to old data buffer 612. The received read command will further instruct SSDp to, via its host interface 120d, output its parity data (corresponding to the data written in NAND devices 140a and 140b of SSD0 and SSD1) to old parity buffer 614.

Then (arrow 730 of FIG. 6, step 730 of FIG. 7), the SSDs will receive a request to perform column-wise parity calculations on data in the buffers. The host will submit four such requests, one to each processor of each SSD. The data for which the parity calculations are performed includes new data stored in buffers 606 and 608, as well as the old data that was output to old buffers 610 and 612 by SSD0 and SSD1. Similarly, the parity calculations are performed on the old parity data that was output to old parity buffer 614 by SSDp.

SSD0 will perform parity calculations on subset 618 of buffers 606, 608, 610, 612, and 614. SSD1 will perform parity calculations on subset 620 of buffers 606, 608, 610, 612, and 614. SSD2 will perform parity calculations on subset 622 of buffers 606, 610, and 614. SSDp will perform parity calculations on subset 624 of buffers 606, 610, and 614.

In response to the request to perform these parity calculations (arrow 740 in FIG. 6, step 740 in FIG. 7), SSD0, SSD1, SSD2, and SSDp will, by their respective processors and via their respective host interfaces, output their newly computed parity data to parity buffer 616.

After the parity data are output to parity buffer 616, the SSDs SSD0, SSD1, and SSDp receive a write command from the host (arrow 750 of FIG. 6, step 740 of FIG. 7), instructing each of the SSDs to write in parallel, to their respective NAND devices and via their processors, the new data and parity data from the respective buffers. In particular, SSD0 will write, by its processor 110a and to its NAND devices 140a, the data in buffer 606. SSD1 will write, by its processor 110b and to its NAND devices 140b, the data in buffer 608. SSDp will write, by its processor 110d and to its NAND devices 140d, the parity data in parity buffer 616, which represents parity data for both the new and old data stored in the SSDs.

The SSDs will then send a response to the host acknowledging completion of the write command (arrow 760 of FIG. 6, step 760 of FIG. 7).

As discussed above, the parity information computed by the SSDs can be used to provide data redundancy. Should an SSD in an SSD system as described herein fail, the parity information can be used to recover the data on the failed SSD. An embodiment in which SSDs perform parity calculations in order to recover lost data on a drive is described with respect to FIGS. 8 and 9.

Figure 8:
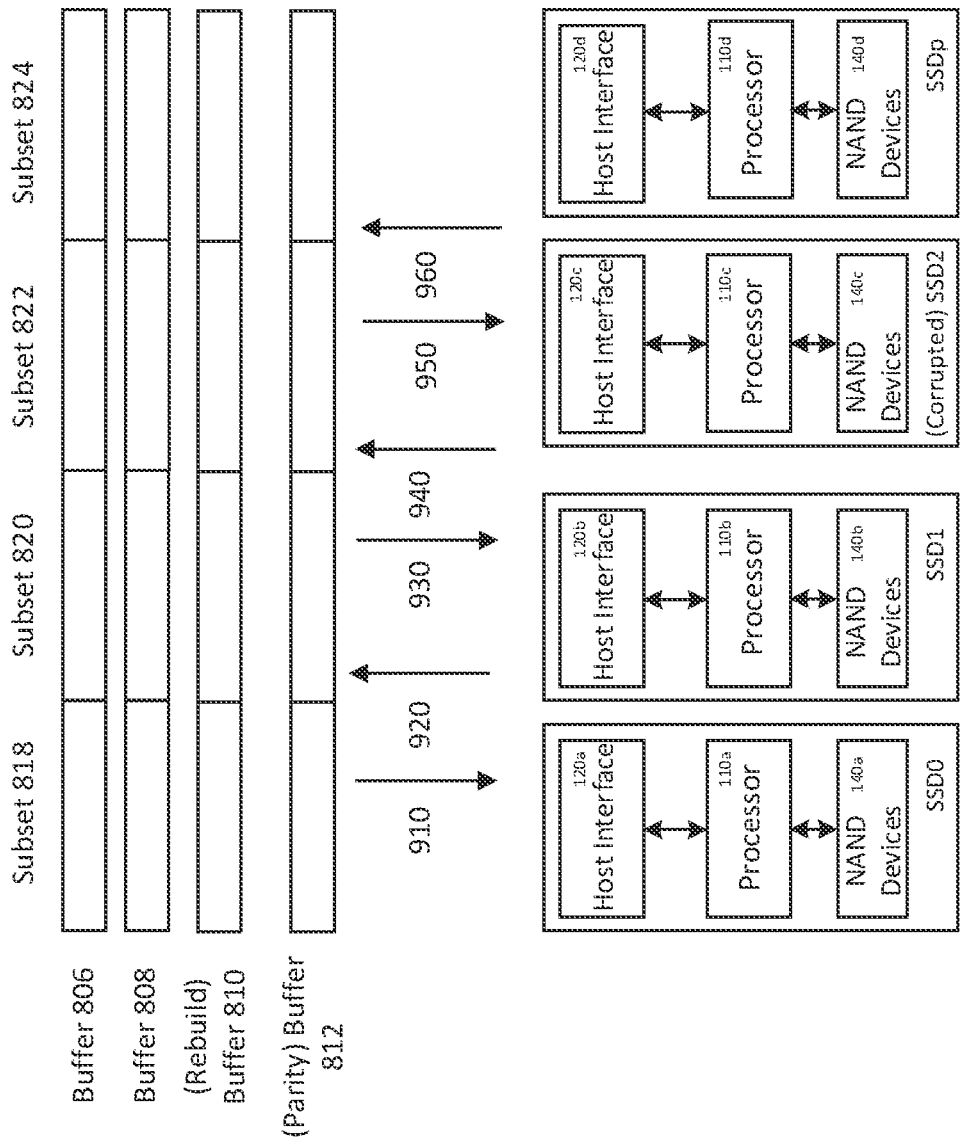
FIG. 8 illustrates how an exemplary system according to one or more embodiments of the present disclosure can use parallel parity computations to recover data lost on a corrupted drive.
Figure 9:
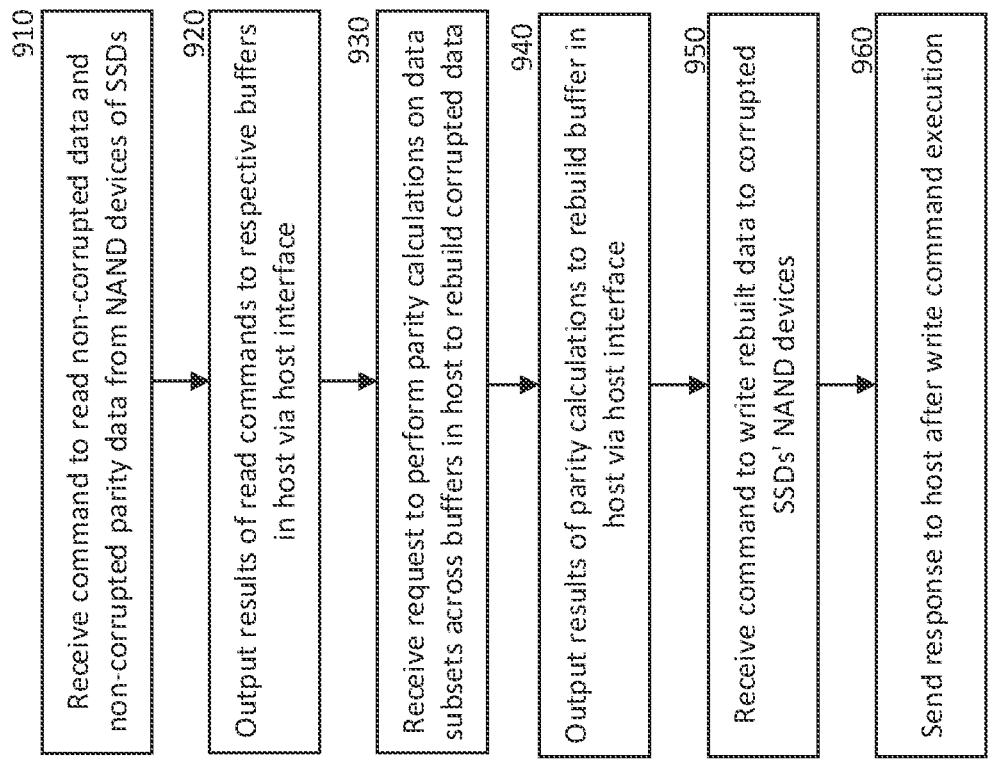
FIG. 9 illustrates a flowchart corresponding to the exemplary workflow of FIG. 8 according to one or more embodiments of the present disclosure.

FIG. 8 shows an SSD system in which SSD0 and SSD1 have data stored on their respective NAND devices 140a and 140b. In the illustrated embodiment of FIG. 8, the data stored on SSD2 is corrupted, such that it cannot be read from NAND devices 140c. SSDp stores on its NAND devices parity data corresponding to the data stored on each of SSD0, SSD1, and SSD2. The parity data stored on SSDp can be used, in conjunction with the data stored on SSD0 and SSD1, to rebuild the data lost from SSD2, in accordance with the following embodiment.

To rebuild the data on SSD2, first (arrow 910 of FIG. 8, step 910 of FIG. 9) the SSDs SSD0, SSD1, and SSDp receive a command from the host to read the data stored on their respective NAND devices. In response to the command (arrow 920 of FIG. 8, step 920 of FIG. 9), SSD0, SSD1, and SSDp output the data stored on their respective NAND devices via their respective host interfaces to respective buffers in the host. In particular, SSD0 will output its stored data to buffer 806 via its host interface 120a. SSD1 will output its stored data to buffer 808 via its host interface 120b. SSDp will output its stored parity data to parity buffer 812 via its host interface 120d. The parity data output to parity buffer 812 is understood to be reflective of the data stored on SSDs SSD0, SSD1, and SSD2. As such, it can be used to rebuild the data stored on SSD2 after corruption.

Then (arrow 930 of FIG. 8, step 930 of FIG. 9), the SSDs SSD0, SSD1, SSD2, and SSDp receive a request from the host to perform parity calculations on the data stored in the buffers 806, 808, and 812. SSD0 performs parity calculations on subset 818 of buffers 806, 808, and 812. SSD1 performs parity calculations on subset 820 of buffers 806, 808, and 812. SSD2 performs parity calculations on subset 822 of buffers 806, 808, and 812. SSDp performs parity calculations on subset 824 of buffers 806, 808, and 812.

The result of the parity calculations is the rebuilt data of SSD2. After the request is received (arrow 940 of FIG. 8, step 940 of FIG. 9), SSD0, SSD1, SSD2, and SSDp output the results of their parity calculations to the designated rebuild buffer 810 via their respective host interfaces. Once the rebuilt data is sent to rebuild buffer 810, the corrupted SSD (in this case, SSD2) can receive a command (arrow 950 of FIG. 8, step 950 of FIG. 9) to write the rebuilt data to its NAND devices 140c. Upon successful completion of the write command (arrow 960 of FIG. 8, step 960 of FIG. 9), the SSDs send a response to the host to acknowledge completion of the write command.

Figure 10:
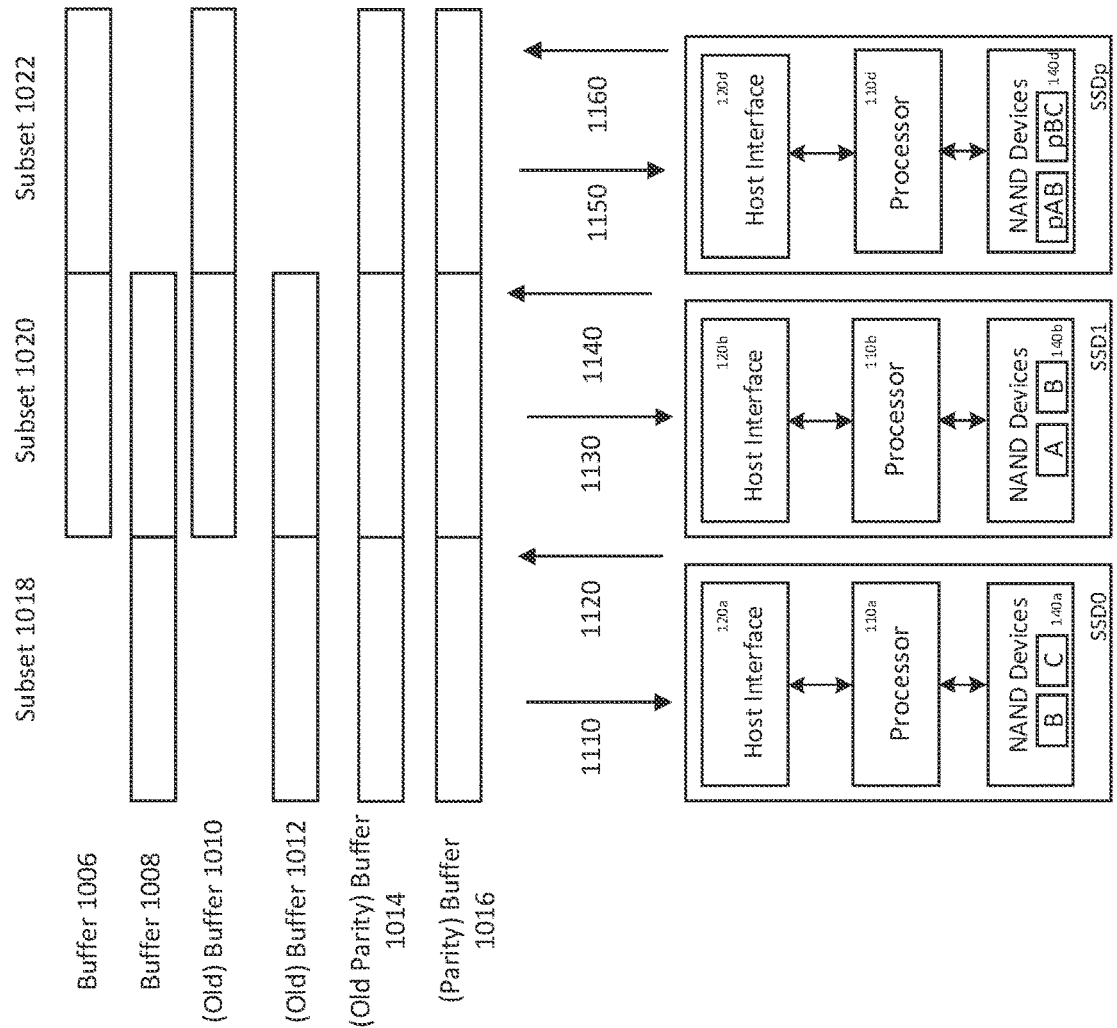
FIG. 10 illustrates how an exemplary system according to one or more embodiments of the present disclosure can use parallel parity computations to write data in the presence of existing, overlapping parity data.
Figure 11:
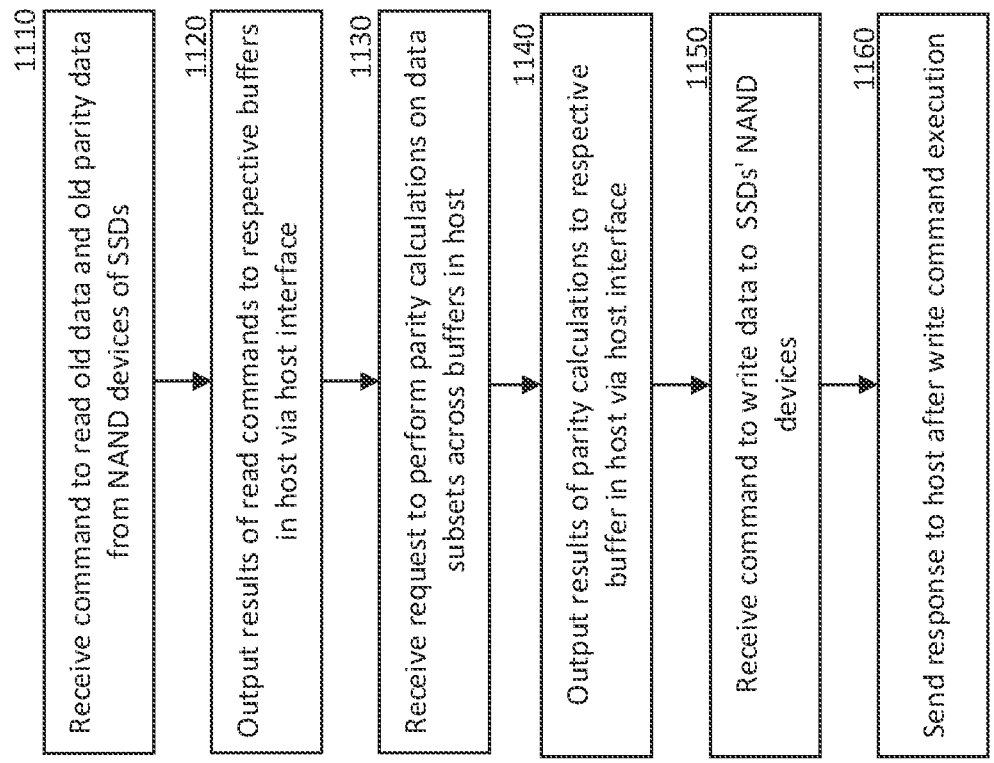
FIG. 11 illustrates a flowchart corresponding to the exemplary workflow of FIG. 10 according to one or more embodiments of the present disclosure.

FIG. 10 demonstrates an embodiment in which an SSD system can write data to multiple drives, in a case in which there is already data stored on the NAND devices of SSD0 and SSD1, and in which SSDp has stored on its NAND devices overlapping parity data corresponding to the data stored in SSD0 and SSD1. While the embodiment of FIGS. 10 and 11 is shown with three SSDs, it is understood that any number of SSDs could be used to similarly write data in the presence of existing overlapping parity data.

As shown in the embodiment of FIG. 10, SSD0 contains on NAND devices 140a data B and data C. SSD1 contains data A and data B on its NAND devices 140b. SSDp contains on NAND devices 140d parity data pAB, and overlapping parity data pBC. Parity data pAB and pBC are overlapping in that they both contain parity information corresponding to data B. The illustrated SSD system can write new data to the SSDs, described as follows.

First (arrow 1110 of FIG. 10, step 1110 of FIG. 11), the SSDs receive a command to read the data currently stored on their respective NAND devices. In response to the read command (arrow 1120 of FIG. 10, step 1120 of FIG. 11), the SSDs output their stored data, by their respective processors and via their respective host interfaces, to the respective buffers in the host address space. In particular, processor 110a of SSD0 will output data B and C to old data buffer 1010. Processor 110b of SSD1 will output data A and B to old buffer 1012. Processor 110d of SSDp will output parity data pAB and pBC to old parity buffer 1014.

Once the results of the read commands have been outputted to the respective buffers, the SSDs receive (arrow 1130 of FIG. 10, step 1130 of FIG. 11) a request to perform parity calculations on data subsets 1018, 1020, and 1022 across buffers 1006, 1008, 1010, 1012, and 1014. In particular, SSD0 will determine parity information for subset 1018 of buffers 1008, 1012, and 1014. SSD1 will determine parity information for subset 1020 of buffers 1006, 1008, 1010, 1012, and 1014. SSDp will determine parity information for subset 1022 of buffers 1006, 1010, and 1014.

After the parity information is determined, the SSDs output (arrow 1140 of FIG. 10, step 1140 of FIG. 11), by their respective processors and via their respective host interfaces, the result of their parity calculations to parity buffer 1016. Once the parity information is contained in parity buffer 1016, the SSDs receive a command to write data from buffers in the host address space to their respective NAND devices. In particular, SSD0 will write, via its processor 110a, data contained in buffer 1006 to NAND devices 140a. SSD1 will write, via its processor 110b, data contained in buffer 1008 to NAND devices 140b. SSDp will write, via its processor 110d, data contained in parity buffer 1016 to NAND devices 140d.

Figure 12:
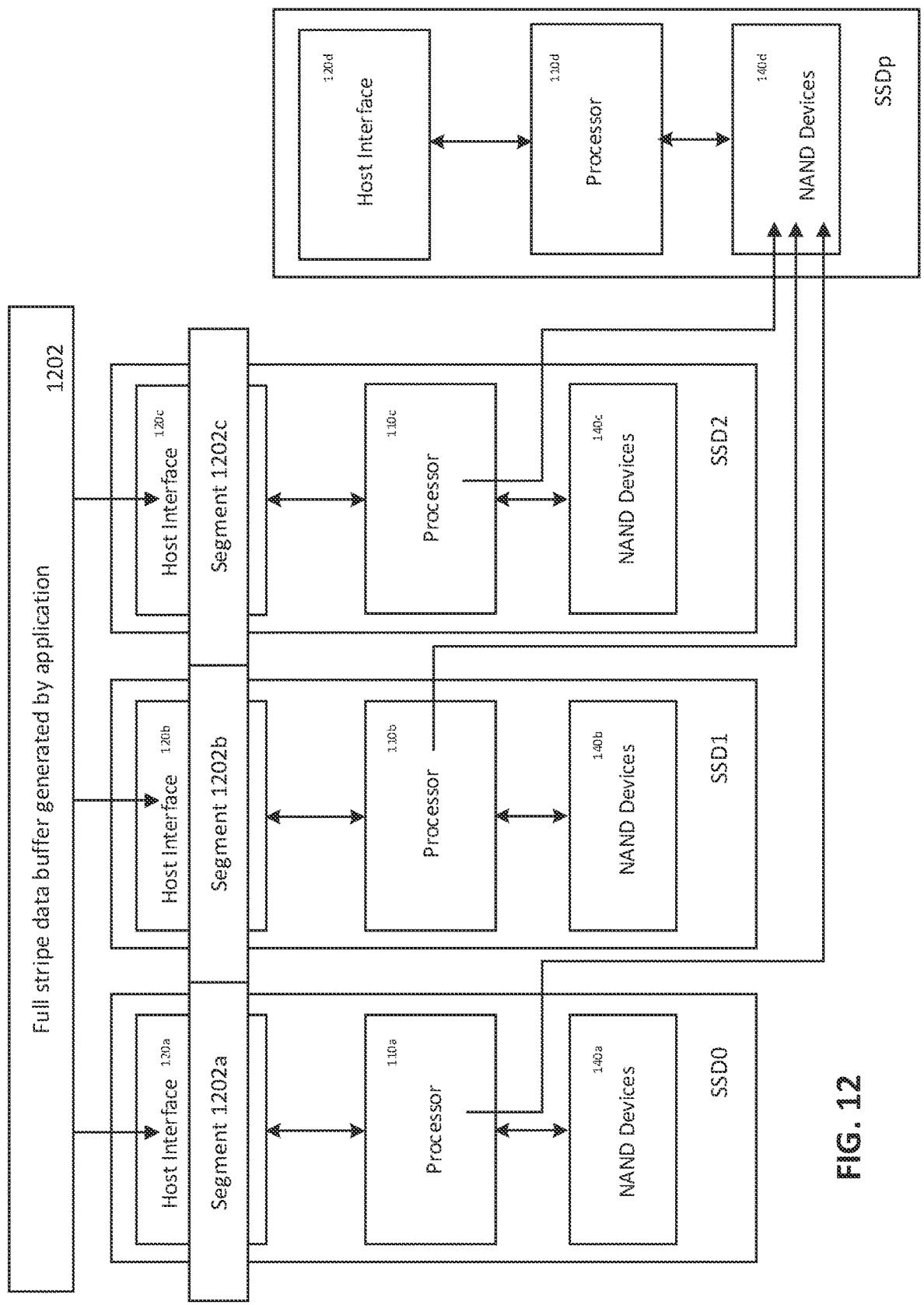
FIG. 12 illustrates how an exemplary SSD system can perform parity calculations on a full data stripe sent to the drives by a host, and split into segments by the drives according to one or more embodiments of the present disclosure.

FIG. 12 demonstrates that, in some systems configured to implement offloaded distributed parity calculations via column-wise XORing, the drives SSD0, SSD1, and SSD2 performing the parity calculations, rather than the host, are configured to split data stripe 1202, compute parity calculations on the data in stripe 1202, and transfer the parity information between one another.

In such embodiments, the host takes a full data stripe 1202 and transfers a segment of the full data stripe to each of the SSDs configured to store the data in the stripe. In particular, in the embodiment of FIG. 12, the host transfers segment 1202a of stripe 1202 to SSD0, segment 1202b of stripe 1202 to SSD1, and segment 1202c of stripe 1202 to SSD2. Each of SSD0, SSD1, and SSD2 further divides its received segment into subsets (not illustrated), the number of subsets being equal to the total number of RAID devices in the configuration. In the exemplary embodiment of FIG. 12, then, the processor of each SSD divides its respective segment 1202a, 1202b, and 1202c into four subsets (four being the total number of SSDs: SSD0, SSD1, SSD2, and SSDp). The processor of each of SSD0, SSD1, and SSD2 then computes parity data on its respective subsets, and subsequently outputs the result of the parity computations to SSDp. SSDp can then calculate final parity data based on the results of the calculations of SSD0, SSD1, and SSD2, the final parity data being reflective of the complete data stripe 1202 originally sent to the drives by the host.

Figure 13:
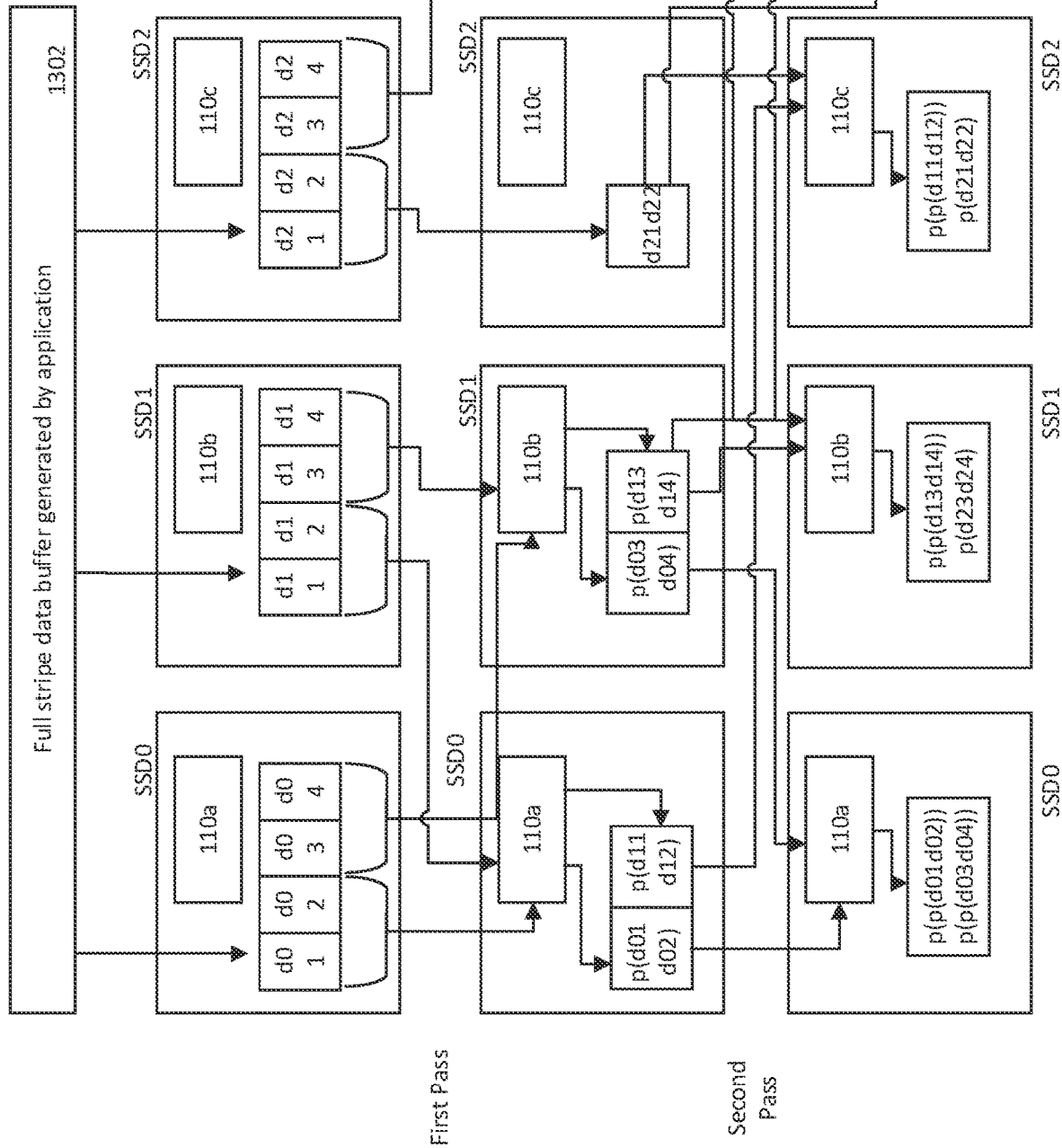
FIG. 13 illustrates a schematic representation of nested parity calculations by four SSDs according to one or more embodiments of the present disclosure.

FIG. 13 illustrates another mechanism by which SSDs in a system configured to implement offloaded distributed parity calculations via column-wise XORing can split a data stripe 1302 received from a host, and transfer corresponding parity information between one another. In the embodiment of FIG. 13, the parity calculations performed by the drives are nested.

As illustrated in the embodiment of FIG. 13, four SSDs are used for nested parity calculations: SSD0, SSD1, SSD2, and SSD2. The four SSDs perform parity calculation on the data stripe 1302 via a series of nested parity calculations in three passes. In such an embodiment, as in FIG. 12, a full stripe of data is sent (via the respective host interfaces of each of the SSDs, not shown) in segments to SSD0, SSD1, and SSD2, each of which then splits the data into subsets by its respective processor 110a, 110b, and 110c. In FIG. 13, processor 110a of SSD0 splits its received data segment into subsets d01, d02, d03, and d04 (where "d" stands for "data", the first number '0' represents that the data is stored on SSD0, and the second number represents the number of the subset). Similarly, processor 110b of SSD1 splits its received data segment into subsets d11, d12, d13, and d14, and processor 110c of SSD2 splits its received data segment into subsets d21, d22, d23, and d24. SSDp is thus configured to store the final parity data corresponding to the data stripe 1302, as outlined as follows.

In the first pass, processor 110a of SSD0 performs parity calculations on subsets d01 and d02. Further, processor 110a of SSD0 performs parity calculations on subsets d11 and d12, received by SSD0 from SSD1. Processor 110a outputs the results of these parity calculations, respectively p(d01d02) and p(d11d12), to its NAND devices. The first pass also comprises parity calculations performed by processor 110b of SSD1 on subsets d03 and d04, received by SSD1 from SSD0. Further, processor 110b of SSD1 performs parity calculations on subsets d13 and d14. Processor 110b outputs the results of these parity calculations, respectively p(d03d04) and p(d13d14), to its NAND devices. Also in the first pass, SSD2 transfers subsets d23 and d24 to SSDp.

In the second pass, processor 110a of SSD0 determines parity information for p(d01d02) and for p(d03d04) received from SSD1. Processor 110a of SSD0 outputs the results of these parity calculations, respectively, p(p(d01d02)) and p(p(d03*d*04)), to its NAND devices. Also in the second pass, processor 110*b* of SSD1 determines parity information for p(d13*d*14) and d23*d*24, received from SSDp. Processor 110*b* outputs the results of these parity calculations, respectively p(p(d13*d*14)) and p(d23*d*24) to its NAND devices. The second pass further sees processor 110*c* of SSD2 perform parity calculations on p(d11*d*12) received from SSD0, and on d21*d*22. Processor 110*c* outputs the results of these parity calculations, respectively p(p(d11*d*12)) and p(d21*d*22) to its NAND devices. Finally, in the second pass, SSDp performs parity calculations on p(d13*d*14), received from SSD1. SSDp outputs the result of this parity calculation, p(p(d13*d*14)) to its NAND devices, along with d21*d*22, received from SSD2.

In a third pass (not illustrated), SSD0, SSD1, and SSD2 pass their computed parity data to SSDp, which then stores the final cumulative parity data. It will be understood that any nested parity schematic can be used in accordance with the embodiments of the present disclosure. Nested parity schematics such as that of FIG. 13 provide the advantage that each SSD can, based on its published processor capability, perform an appropriate portion of the parity calculations offloaded from the server. As such, SSDs implementing such nested parity calculations can flexibly and efficiently use their processors to free up server bandwidth.

FIG. 14 illustrates a flowchart corresponding to an exemplary method of use of a SSD system as described herein. In the method described by FIG. 14, the processor of an SSD accesses, via a host interface, a host address space (step 1410). In step 1420, the processor of the SSD determines parity information for data stored across a plurality of buffers in the host address space. In step 1430, the processor outputs the determined parity information to the host interface. The method of FIG. 14 can be implemented with regard to any of the aforementioned embodiments of the present disclosure.

Other objects, advantages and embodiments of the various aspects of the present invention will be apparent to those who are skilled in the field of the invention and are within the scope of the description and the accompanying drawings. For example, but without limitation, structural or functional elements might be rearranged consistent with the present invention. Similarly, principles according to the present invention could be applied to other examples, which, even if not specifically described here in detail, would nevertheless be within the scope of the present invention.

The invention claimed is:

1. A system comprising:
a plurality of buffers configured to collectively store a stripe of data generated by a host, each buffer of the plurality of buffers configured to have a respective range of addresses in a host address space;
a plurality of solid-state drives (SSDs) in communication with the host via a host interface, each SSD comprising a processor, the processor configured to:
access the plurality of buffers via the host interface;
determine parity information for the stripe of data stored across the plurality of buffers; and
output the parity information to the host via the host interface.

2. The system of claim 1, wherein each SSD comprises a nonvolatile memory device associated with the processor of the each SSD of the plurality of SSDs,
wherein the processor is further configured to write data stored in one of the plurality of buffers to the associated nonvolatile memory device.

3. The system of claim 2, wherein the processor of at least one SSD of the plurality of SSDs is configured to write the parity information determined by the processor of the each SSD of the plurality of SSDs to its associated nonvolatile memory device.

4. The system of claim 2, wherein the nonvolatile memory device associated with the processor of the each SSD of the plurality of SSDs comprises a NAND memory device.

5. The system of claim 1, wherein the processor of the each SSD of the plurality of SSDs is configured to execute a write command from the host in parallel.

6. The system of claim 1, wherein the processor of the each SSD of the plurality of SSDs is configured to access the entirety of the host address space.

7. The system of claim 1, wherein the host interface is a peripheral component interface express (PCIe) interface.

8. The system of claim 1, wherein the processor of the each SSD of the plurality of SSDs is a direct memory access controller (DMAC) engine.

9. The system of claim 1, wherein the plurality of buffers in the host address space are of equal size.

10. The system of claim 1, wherein the plurality of buffers comprise controller memory buffers (CMBs) of the plurality of SSDs.

11. A system comprising:
a plurality of solid-state drives (SSDs) in communication with a host via a host interface, each SSD comprising a processor, the processor configured to:
access a host address space via the host interface;
determine parity information for data stored across a plurality of buffers in the host address space; and
output the parity information to the host interface,
wherein each buffer of the plurality of buffers in the host address space is divided into a number of subsets, each subset comprising a range of addresses of data stored in the plurality of buffers, and wherein the processor of the each SSD of the plurality of SSDs determines parity information for a subset across the plurality of buffers.

12. The system of claim 11, wherein the number of subsets is equivalent to the number of SSDs in the plurality of SSDs.

13. A method for performing parity calculations by a plurality of solid-state drives (SSDs), the method comprising:
collectively storing, in a plurality of buffers, a stripe of data generated by a host, each buffer of the plurality of buffers having a respective range of addresses in a host address space;
accessing, by a processor of an SSD of the plurality of SSDs, the plurality of buffers via a host interface through which each SSD of the plurality of SSDs is in communication with the host;
determining parity information for the stripe of data stored across the plurality of buffers; and
outputting the parity information to the host via the host interface.

14. The method of claim 13, wherein each processor of each SSD of the plurality of SSDs has an associated nonvolatile memory device, and further comprising:
writing, by the processor of each SSD of the plurality of SSDs, data stored in one of the plurality of buffers to the associated nonvolatile memory device.

15. The method of claim 14, further comprising writing, by the processor of at least one SSD of the plurality of SSDs, the parity information determined by the processor of each SSD of the plurality of SSDs to its associated nonvolatile memory device.

16. The method of claim 14, wherein the nonvolatile memory device associated with the processor of each SSD of the plurality of SSDs comprises a NAND memory device.

17. The method of claim 13, wherein the host address space is divided into a number of subsets, each subset comprising the range of addresses of data stored in the plurality of buffers, and further comprising:
 determining, by the processor of each SSD of the plurality of SSDs, parity information for a subset of the number of subsets.

18. The method of claim 17, wherein the number of subsets is equivalent to the number of SSDs in the plurality of SSDs.

19. The method of claim 13, further comprising executing in parallel, by the processor of each SSD of the plurality of SSDs, a write command from the host.

20. The method of claim 13, further comprising accessing, by the processor of each SSD of the plurality of SSDs, the entirety of the host address space.

\* \* \* \* \*